United States Patent

McKenzie

[11] 3,957,419
[45] May 18, 1976

[54] FLUIDISED BED COMBUSTION SYSTEM

[75] Inventor: Edwin Charles McKenzie, London, England

[73] Assignee: Babcock & Wilcox Limited, London, England

[22] Filed: Dec. 16, 1974

[21] Appl. No.: 533,457

[30] Foreign Application Priority Data
Dec. 17, 1973 United Kingdom............... 58377/73

[52] U.S. Cl. ................................ 431/170; 110/28 J
[51] Int. Cl.² .......................................... F23D 19/02
[58] Field of Search..................... 431/170; 122/4 D; 110/8 F, 28 J

[56] References Cited
UNITED STATES PATENTS

| | | |
|---|---|---|
| 3,397,657 | 8/1968 | Tada................................ 110/28 X |
| 3,737,283 | 6/1973 | Nikles................................ 431/170 |
| 3,799,747 | 3/1974 | Schmalfeld et al. ............... 110/28 X |
| 3,859,963 | 1/1975 | Roberts et al. ..................... 110/28 X |

Primary Examiner—Kenneth W. Sprague
Attorney, Agent, or Firm—Kemon, Palmer & Estabrook

[57] ABSTRACT

This invention relates to fluidised bed combustion systems and facilitates the maintenance of the depth of the bed. A discharge pipe projects upwardly into the bed so that bed material can flow into its upper end and escape downwardly. The end of the pipe is surrounded by an enclosure and air is discharged into the enclosure so that material will enter the pipe from within the enclosure and have been cooled in the enclosure by the air discharged into it. The walls of the enclosure may themselves be cooled. The invention is illustrated in FIG. 1.

5 Claims, 4 Drawing Figures

FLUIDISED BED COMBUSTION SYSTEM

This invention relates to fluidised bed combustion system.

It has been proposed that a furnace should be fired by fuel burnt in a fluidised combustion bed. Broken brick, or any other suitable refractory material, has been suggested as the material from which the bed is formed, the size of the material being chosen to suit the fluidising velocity. When the fuel is of a kind that results in a high ash residue, the quantity of material in the bed will increase with use; limestone or dolomite may be included in the material of which the bed is formed, so that sulphur in the fuel will tend to form compounds that are retained in the bed rather than gases that escape through the stack, and this retention, and the need to replenish the limestone or dolomite during operation of the furnace, will result in a tendency for the quantity of material in the bed to increase.

An object of the invention is to facilitate the maintenance of a desired depth to the bed of a fluidised combustion bed.

According to the present invention, there is provided a furnace having a fluidised bed, means for supplying air to the bed, means for supplying fuel to the bed, means defining a space having an opening through which material from the bed can enter the space, a material discharge pipe leading from within the space through the bottom of the furnace and means for discharging air into the spaced, the means for supplying fuel being such that fuel is not discharged into the space.

By way of example, an embodiment of the invention will now be described with reference to the accompanying drawing in which FIG. 1 shows diagrammatically a vertical section through the lower end of a fluidised bed furnace chamber, taken on the line I—I of FIG. 2;

Figure 1:
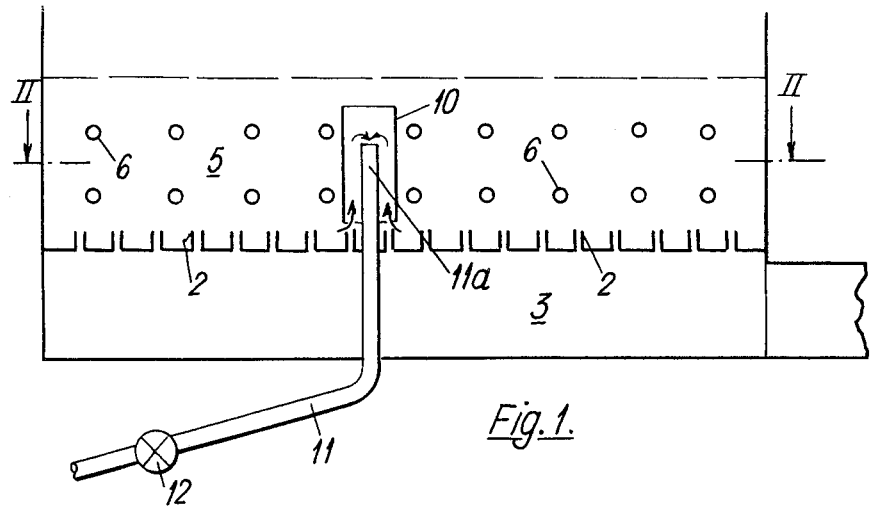
Figure 2:
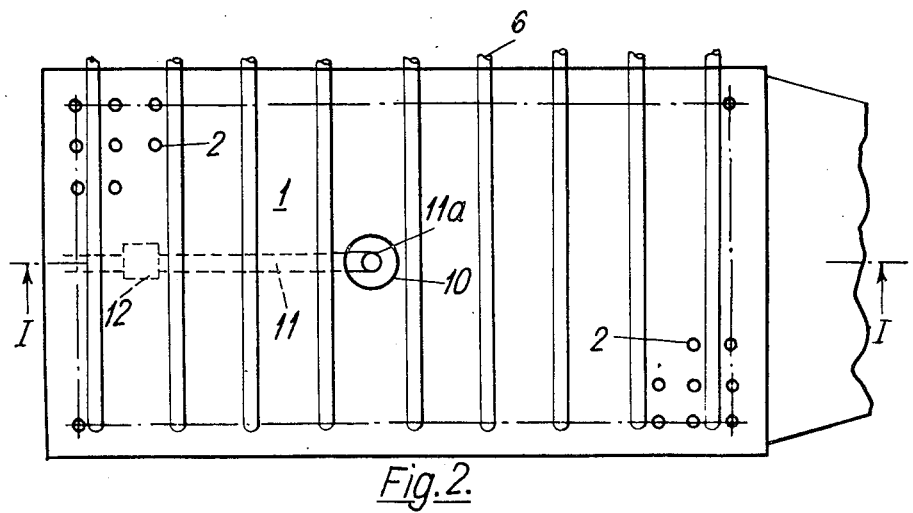
FIG. 2 shows diagrammatically a horizontal section on line II—II of FIG. 1.

The floor 1 of the furnace is provided with upwardly extending nozzles 2. Air is injected into the bed through some of the nozzles 2 and fuel is injected into the bed through other of the nozzles 2, the nozzles being supplied from plenum chambers accommodated in the space 3 below the floor 1. The upper ends of the fuel nozzles are at a level higher than the upper ends of the air nozzles. The floor 1, and the nozzles 2, are covered with broken brick, or other inert material, constituting the bed 5, and cooling tubes 6, through which a coolant can be passed to control the temperature of the bed 5, extend horizontally through the bed.

An upright enclosure 10, in the form of a cylinder open at its upper and lower ends, is immersed within the bed 5 with its lower end spaced from the floor 1 of the furnace at a level between the upper ends of the fuel nozzles and the upper ends of the air nozzles. At least one of the nozzles 2 through which air discharges lies below the cylinder 10 so that air discharging from them passes into the space within the cylinder 10. The inlet end part 11a of a discharge pipe 11, controlled by valve 12, lies concentrically within the cylinder 10, with its inlet end below the upper end of the cylinder 10 and the pipe 11 extends down through the floor 1 of the furnace between the air nozzles that discharge into the space within the cylinder 10.

Figure 4:
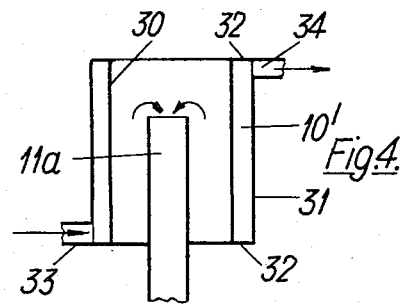
FIG. 4 shows, on the same scale, an alternative to the detail shown in FIG. 3.
Figure 3:
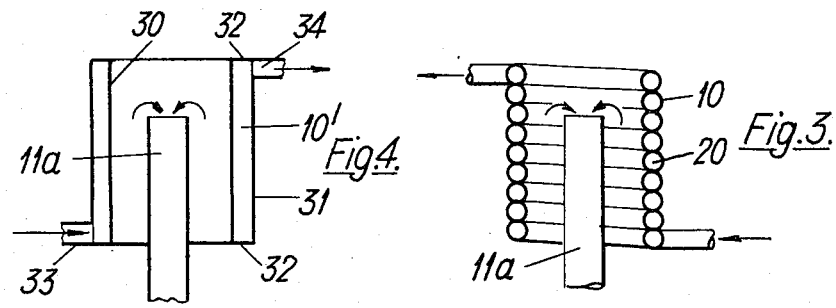
FIG. 3 shows a detail of FIG. 1 on a larger scale.

The cylinder 10 is formed by a spirally wound duct 20 that is connected to a source of fluid that may be sent through the duct from the bottom of the cylinder 10 to the top to cool it. In the alternative shown in FIG. 4, the cylinder 10' is formed from concentric inner and outer sleeves 30 and 31 respectively, with an annular gap between them. Seals 32 extend between the upper and the lower ends of the sleeves 30 and 31 and ducts 33 and 34 are provided whereby coolant may be caused to flow through the gap from the lower to the upper end.

In operation of the furnace, fuel is supplied to the bed forming, perhaps, only 1 percent of the total. The air that is supplied through the nozzles supports combustion and maintains the bed fluidised. To ensure that ash formed by combustion does not result in the depth of the bed becoming excessive, bed material is removed through the discharge pipe 11 from the space within the cylinder 10. The fluidised material within the cylinder 10 will overflow into the inlet part 11a and flow thence down the rest of the pipe 11 to an outlet. The material that has been removed from within the cylinder 10 will be replaced by further material flowing into it from outside the space within the cylinder 10, and as fuel is discharged into the bed at a level above the lower end of the cylinder, the material in the space will be cooler than the material outside it and is therefore less likely to damage the discharge pipe 12, and the valve 12, than would material drawn from elsewhere in the bed. The passage of coolant through the tube 20 (or between the concentric tubes 30 and 31) that defines the cylinder 10 will also tend to reduce the temperature of the material within the space and simultaneously ensure that the cylinder does not become overheated.

In the embodiment that has been described the means defining the space from which material is withdrawn is cylindrical. In modifications, the space may be defined by enclosures of other shapes; a space may, for instance, be marked off at the corner of the bed. It is also envisaged that the means defining the space may project above the bed, so that material enters the space only from below. Since the temperature of the bed is controlled by the flow of coolant through the tubes 6, it is envisaged that the means defining the space may be formed from heat resistant material that is not especially cooled. The material removed from such a space will be cooler than that outside it since it will have been cooled by air discharging into it.

We claim:

1. A furnace having a fluidised bed, walls forming the lateral boundaries of an upright space within the bed and so disposed relatively to the floor of the bed as to provide an opening through which material from the bed outside the space can flow upwardly into the space, a material discharge pipe leading from a level within the space above the opening down through the floor of the furnace, means for supplying fuel to the bed outside the space, and means for supplying air to the bed so that air is discharged into the space.

2. A furnace as claimed in claim 1 in which the space is open at its upper end and the upper end lies below the top of the bed.

3. A furnace as claimed in claim 1 in which the walls forming the lateral boundaries of the upright space are included in a flow path through which a coolant fluid can be passed.

4. A furnace as claimed in claim 3 in which the walls are formed by a spirally wound tube.

5. A furnace as claimed in claim 3 in which the walls are defined by an inner cylinder lying within, and spaced from, an outer cylinder, and there is means forming seals between the ends of the cylinders.

* * * * *